(12) United States Patent
Yuan et al.

(10) Patent No.: US 11,900,220 B2
(45) Date of Patent: Feb. 13, 2024

(54) METHOD AND APPARATUS FOR AMPLITUDE ESTIMATION OF QUANTUM CIRCUIT, STORAGE MEDIUM, AND ELECTRONIC APPARATUS

(71) Applicant: Origin Quantum Computing Technology (Hefei) Co., Ltd, Hefei (CN)

(72) Inventors: Yewei Yuan, Hefei (CN); Ye Li, Hefei (CN); Ningbo An, Hefei (CN); Menghan Dou, Hefei (CN)

(73) Assignee: Origin Quantum Computing Technology (Hefei) Co., Ltd, Hefei (CN)

( * ) Notice: Subject to any disclaimer, the term of this patent is extended or adjusted under 35 U.S.C. 154(b) by 0 days.

(21) Appl. No.: 18/310,405

(22) Filed: May 1, 2023

(65) Prior Publication Data

US 2023/0325697 A1 Oct. 12, 2023

Related U.S. Application Data

(63) Continuation of application No. PCT/CN2021/139174, filed on Dec. 17, 2021.

(30) Foreign Application Priority Data

Dec. 29, 2020 (CN) .......................... 202011591351.6

(51) Int. Cl.
*G06N 10/20* (2022.01)
*G06N 10/60* (2022.01)

(52) U.S. Cl.
CPC ............. *G06N 10/20* (2022.01); *G06N 10/60* (2022.01)

(58) Field of Classification Search
None
See application file for complete search history.

(56) References Cited

U.S. PATENT DOCUMENTS

| | | | |
|---|---|---|---|
| 6,578,018 | B1 | 6/2003 | Ulyanov |
| 2019/0378208 | A1 | 12/2019 | Woerner et al. |

(Continued)

FOREIGN PATENT DOCUMENTS

| | | |
|---|---|---|
| CN | 108713206 A | 10/2018 |
| CN | 110188885 A | 8/2019 |

(Continued)

OTHER PUBLICATIONS

Chen et al., Quantum K-nearest neighbor algorithm, Journal of Southeast University (Natural Science Edtion), vol. 45, No. 4, pp. 647-651, dated Jul. 31, 2015.

(Continued)

*Primary Examiner* — Alan Chen
(74) *Attorney, Agent, or Firm* — Westbridge IP LLC

(57) ABSTRACT

Disclosed are a method and an apparatus for amplitude estimation of a quantum circuit. The method includes: calculating a first difference value between a current angle upper limit value and a current angle lower limit value corresponding to a to-be-estimated amplitude of a target quantum state, and determining the first difference value as a target difference; determining, a next angle amplification factor and a next flag parameter corresponding to a next iteration step; amplifying the target quantum circuit by the next angle amplification factor; calculating a second difference value between a next angle upper limit value and a next angle lower limit value of the to-be-estimated amplitude, and determining the second difference value as a target difference; and determining, based on an angle upper limit value and an angle lower limit value that reach the precision (Continued)

threshold, a probability estimated value corresponding to a to-be-estimated quantum bit.

10 Claims, 3 Drawing Sheets

(56) References Cited

U.S. PATENT DOCUMENTS

| | | | |
|---|---|---|---|
| 2020/0394276 A1 | 12/2020 | Woerner et al. | |
| 2020/0394537 A1 | 12/2020 | Wang et al. | |
| 2021/0342728 A1* | 11/2021 | Woerner | G06F 17/18 |

FOREIGN PATENT DOCUMENTS

| | | |
|---|---|---|
| CN | 111563598 A | 8/2020 |
| CN | 111931939 A | 11/2020 |

OTHER PUBLICATIONS

International Search Report issued in corresponding PCT Application No. PCT/CN2021/139174, dated Feb. 24, 2022.
Jizuo et al., Analysis of Quantum Search Algorithms for Arbitrary Amplitude Distribution, Science Technology and Engineering, vol. 11, No. 36, pp. 8998-9003, dated Dec. 31, 2011.
Written Opinion issued in corresponding PCT Application No. PCT/CN2021/139174, dated Feb. 24, 2022.

* cited by examiner

METHOD AND APPARATUS FOR AMPLITUDE ESTIMATION OF QUANTUM CIRCUIT, STORAGE MEDIUM, AND ELECTRONIC APPARATUS

CROSS-REFERENCE TO RELATED APPLICATIONS

This application is a continuation of International Application No. PCT/CN2021/139174, filed on Dec. 17, 2021, which claims priority to Chinese Patent Application No. 202011591351.6, filed on Dec. 29, 2020 and entitled "METHOD AND APPARATUS FOR AMPLITUDE ESTIMATION OF QUANTUM CIRCUIT, STORAGE MEDIUM, AND ELECTRONIC APPARATUS". The disclosures of the aforementioned applications are hereby incorporated by reference in their entireties.

TECHNICAL FIELD

The present application belongs to the field of quantum computing technologies, and in particular, to a method and an apparatus for amplitude estimation of a quantum circuit, a storage medium, and an electronic apparatus.

BACKGROUND

Quantum computers are physical apparatuses that perform high-speed mathematical and logical operations as well as store and process quantum information in accordance with the laws of quantum mechanics. An apparatus is a quantum computer if the apparatus processes and computes quantum information and runs quantum algorithms. The quantum computers are a key technology under study because they have a capability of processing mathematical problems more efficiently than common computers, for example, the quantum computers may shorten a time period for decoding an Rivest-Shamir-Adleman (RSA) key from hundreds of years to hours.

The iterative quantum amplitude estimation (IQAE) algorithm is a quantum-classical hybrid algorithm for estimating an amplitude of a quantum state. In this algorithm, quantum phase estimation (QPE) is not required. Instead, amplitude estimation is performed based on amplitude amplification and a confidence interval. Therefore, only relatively small quantities of bits, quantum logic gates, and measurement times are needed to enable a confidence interval to reach required estimation precision. In the classical Monte Carlo method, a quantity of needed samples is $(1/\varepsilon)^2$. In comparison, the algorithm may achieve an acceleration effect at a log-log level. However, an existing method for amplitude estimation of a quantum circuit is prone to a problem that an amplitude value cannot converge.

SUMMARY

An objective of the present application is to provide a method and an apparatus for amplitude estimation of a quantum circuit, a storage medium, and an electronic apparatus, to solve a technical problem that an amplitude value cannot converge in an existing method for amplitude estimation.

An embodiment of the present application provides a method for amplitude estimation of a quantum circuit. The method for amplitude estimation of a quantum circuit includes:

determining a target quantum state of a target quantum bit in a target quantum circuit, calculating a first difference value between a current angle upper limit value and a current angle lower limit value that are corresponding to a to-be-estimated amplitude of the target quantum state, and determining the first difference value as a target difference;

determining, based on a preset intermediate variable parameter, the current angle upper limit value, and the current angle lower limit value, a next angle amplification factor and a next flag parameter that are corresponding to a next iteration step, when the target difference is greater than a preset precision threshold;

controlling a preset amplification quantum circuit to amplify the target quantum circuit by the next angle amplification factor, and measuring a target quantum state of the target quantum bit in the amplified target quantum circuit based on a preset total quantity of observation times;

calculating a second difference value between a next angle upper limit value and a next angle lower limit value of the to-be-estimated amplitude based on the current angle upper limit value, the current angle lower limit value, the next angle amplification factor, the next flag parameter, and a measurement result of the target quantum state, determining the second difference value as a target difference and repeating the process until the target difference is not greater than the precision threshold; and determining, based on an angle upper limit value and an angle lower limit value that reach the precision threshold, a probability estimated value corresponding to a to-be-estimated quantum bit.

Optionally, after the step of controlling a preset amplification quantum circuit to amplify the target quantum circuit by the next angle amplification factor, and measuring a target quantum state of the target quantum bit in the amplified target quantum circuit based on a preset total quantity of observation times, the method further includes:

determining, based on a preset maximum iteration quantity, a preset initial scale factor, and an iteration error corresponding to the current iteration step, a quantity of observation times of observing the target quantum state in the next iteration step as the total quantity of observation times; and counting a target quantity of times that the target quantum state is a specified state, calculating, based on the target quantity of times and the total quantity of observation times, a target frequency parameter obtained when the target quantum state is the specified state, and determining the target frequency parameter as the measurement result.

Optionally, after the step of counting a target quantity of times that the target quantum state is a specified state, and calculating, based on the target quantity of times and the total quantity of observation times, a target frequency parameter obtained when the target quantum state is the specified state, the method further includes:

calculating, based on a preset confidence interval estimation function, the maximum iteration quantity, and the total quantity of observation times, a length of a frequency confidence interval corresponding to the target frequency parameter; and estimating, based on the length of the frequency confidence interval, the frequency confidence interval corresponding to the target frequency parameter.

Optionally, the step of calculating a second difference value between a next angle upper limit value and a next angle lower limit value of the to-be-estimated amplitude based on the current angle upper limit value, the current angle lower limit value, the next angle amplification factor, the next flag parameter, and a measurement result of the target quantum state includes:

- calculating, according to a triangular transformation formula and based on the next flag parameter and the frequency confidence interval, an angle confidence interval corresponding to a current angle;
- determining the next angle upper limit value based on an upper limit value corresponding to the angle confidence interval, the current angle upper limit value, and the next angle amplification factor;
- determining the next angle lower limit value based on a lower limit value corresponding to the angle confidence interval, the current angle lower limit value, and the next angle amplification factor; and
- calculating the second difference value between the next angle upper limit value and the next angle lower limit value of the to-be-estimated amplitude.

Optionally, the step of determining, based on an angle upper limit value and an angle lower limit value that reach the precision threshold, a probability estimated value corresponding to a to-be-estimated quantum bit includes:

- calculating, based on the angle upper limit value and the angle lower limit value that reach the precision threshold, an upper limit value and a lower limit value that are corresponding to the frequency confidence interval, and determining, based on an average value of the upper limit value and the lower limit value that are corresponding to the frequency confidence interval, an estimated amplitude value corresponding to the to-be-estimated amplitude.

Optionally, the preset confidence interval estimation function includes a Chernoff-Hoeffding function or a Clopper-Pearson function.

Optionally, the step of determining, based on a preset intermediate variable parameter, the current angle upper limit value, and the current angle lower limit value, a next angle amplification factor and a next flag parameter that are corresponding to a next iteration step, when the target difference is greater than a preset precision threshold includes:

- when the target difference is greater than the precision threshold, obtaining a variable parameter in the current iteration step, reducing the variable parameter in the current iteration step by a preset value, and determining the reduced variable parameter as an intermediate variable parameter corresponding to the next iteration step;
- determining a next angle maximum value based on the current angle upper limit value and the intermediate variable parameter;
- determining a next angle minimum value based on the current angle lower limit value and the intermediate variable parameter; and
- determining, based on the next angle maximum value and the next angle minimum value, the next angle amplification factor and the next flag parameter that are corresponding to the next iteration step.

Another embodiment of the present application provides an apparatus for amplitude estimation of a quantum circuit. The apparatus for amplitude estimation of a quantum circuit includes:

- a first difference value calculation module, configured to: determine a target quantum state of a target quantum bit in a target quantum circuit, calculate a first difference value between a current angle upper limit value and a current angle lower limit value that are corresponding to a to-be-estimated amplitude of the target quantum state, and determine the first difference value as a target difference;
- an angle factor calculation module, configured to: determine, based on a preset intermediate variable parameter, the current angle upper limit value, and the current angle lower limit value, a next angle amplification factor and a next flag parameter that are corresponding to a next iteration step, when the target difference is greater than a preset precision threshold;
- a quantum state measurement module, configured to: control a preset amplification quantum circuit to amplify the target quantum circuit by the next angle amplification factor, and measure a target quantum state of the target quantum bit in the amplified target quantum circuit based on a preset total quantity of observation times;
- a second difference value calculation module, configured to: calculate a second difference value between a next angle upper limit value and a next angle lower limit value of the to-be-estimated amplitude based on the current angle upper limit value, the current angle lower limit value, the next angle amplification factor, the next flag parameter, and a measurement result of the target quantum state, determine the second difference value as a target difference and repeating the process until the target difference is not greater than the precision threshold; and
- a target amplitude estimation module, configured to determine, based on an angle upper limit value and an angle lower limit value that reach the precision threshold, a probability estimated value corresponding to a to-be-estimated quantum bit.

Another embodiment of the present application provides a storage medium. The storage medium stores a computer program. When the computer program is run, the method according to any one of the foregoing implementations is performed.

Another embodiment of the present application provides an electronic apparatus, including a memory and a processor. The memory stores a computer program. The processor is configured to run the computer program, so that the method according to any one of the foregoing implementations is performed.

In comparison with the conventional technologies, based on the method for amplitude estimation of a quantum circuit provided in the present application, in the present application, the next angle amplification factor and the next flag parameter corresponding to the next iteration step are determined based on the intermediate variable parameter, the current angle upper limit value, and the current angle lower limit value in the current iteration step when the difference between the current angle upper limit value and the current angle lower limit value in the current iteration step is greater than the precision threshold. In addition, the amplification quantum circuit is controlled to amplify the target quantum circuit by using the next angle amplification factor as an amplification parameter, to facilitate measurement of the target quantum state of the target quantum bit in the amplified target quantum circuit. Then, the next angle upper limit value and the next angle lower limit value in the next iteration step are calculated based on the measurement result of the target quantum state with reference to parameters such as the current angle upper limit value, the current angle lower limit value, the next angle amplification factor, and the next flag parameter. The iteration stops when the difference between the next angle upper limit value and the angle lower limit value is less than the precision threshold. In addition, the amplitude estimation for the to-be-estimated amplitude is completed based on the measurement result of the target quantum state. Therefore, an amplification parameter of an amplification quantum circuit in each iteration step is determined. Continuous iteration is performed to make a difference between an angle upper limit value and an angle lower limit value not greater than the precision threshold. In this way, the problem that an amplitude value cannot converge is avoided, and precision of an estimated amplitude value is improved.

DETAILED DESCRIPTIONS OF THE EMBODIMENTS

The embodiments described below with reference to the accompanying drawings are exemplary and merely used to explain the present application, but may not be understood as a limitation on the present application.

The embodiments of the present application first provide a method for amplitude estimation of a quantum circuit. The method may be applied to an electronic device, for example, a computer terminal, specifically, a common computer or a quantum computer.

Figure 1:
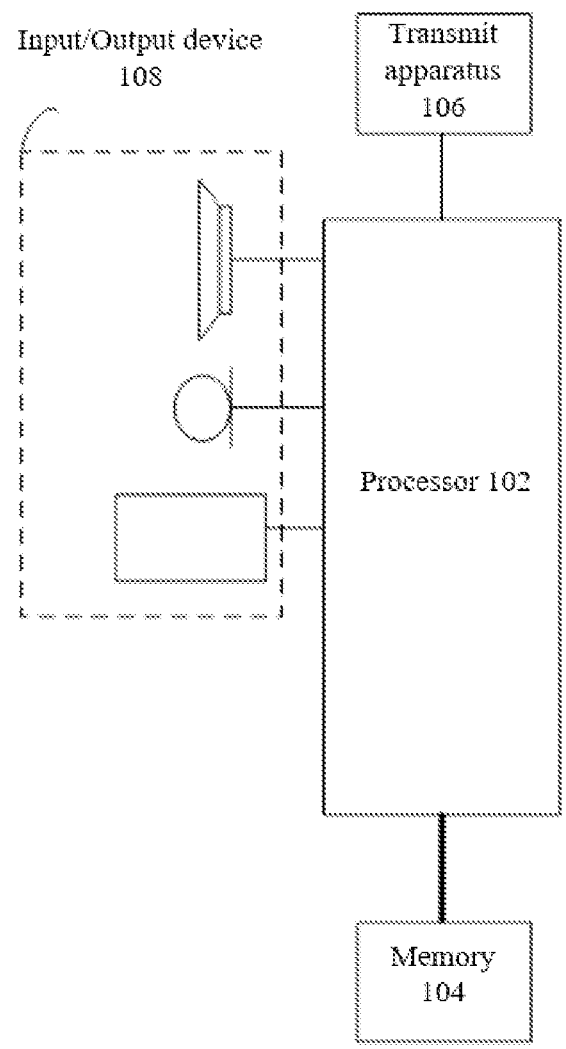
FIG. 1 is a block diagram of a hardware structure of a computer terminal in a method for amplitude estimation of a quantum circuit according to an embodiment of the present application.

The following describes the method in detail by using an example in which the method is run on a computer terminal. FIG. 1 is a block diagram of a hardware structure of a computer terminal in a method for amplitude estimation of a quantum circuit according to an embodiment of the present application. As shown in FIG. 1, the computer terminal may include one or more processors 102 (only one processor is shown in FIG. 1) (the processor 102 may include but is not limited to a processing device such as a microprocessor MCU or a programmable logic device FPGA), and a memory 104 configured to store a quantum circuit. Optionally, the computer terminal may further include a transmit device 106 and an input/output device 108 that are configured to implement a communication function. A person of ordinary skill in the art may understand that the structure shown in FIG. 1 is merely an example and does not constitute any limitation on a structure of the computer terminal. For example, the computer terminal may alternatively include more or fewer components than those shown in FIG. 1, or have a configuration different from that shown in FIG. 1.

The memory 104 may be configured to store a software program and a software module of application software, for example, program instructions/modules corresponding to the method for amplitude estimation of a quantum circuit in the embodiments of the present application. By running the software program and the software module stored in the memory 104, the processor 102 executes various functional applications and data processing, that is, implements the foregoing method. The memory 104 may include a high-speed random access memory, and may further include a non-volatile memory, for example, one or more disk storage apparatus, a flash memory, or another non-volatile solid-state memory. In some examples, the memory 104 may include a memory that is remotely disposed relative to the processor 102, and the remote memory may be connected to the computer terminal over a network. Examples of the network include but are not limited to the Internet, a corporate intranet, a local area network, a mobile communication network, and a combination thereof.

The transmit apparatus 106 is configured to send or receive data over a network. A specific example of the network may include a wireless network provided by a communication provider of a computer terminal. In an example, the transmit apparatus 106 includes a network interface controller (NIC). The network adapter may be connected to another network device through a base station to communicate with the Internet. In an example, the transmit apparatus 106 may be a radio frequency (RF) module. The radio frequency module is configured to communicate with the Internet in a wireless manner.

It should be noted that a real quantum computer is a hybrid structure that includes two main parts: One is a classical computer responsible for classical computation and control. The other is a quantum device responsible for running quantum programs to implement quantum computation. The quantum program is an instruction sequence that is written in a quantum language such as the QRunes language and that may be run on the quantum computer. In this way, quantum logic gate operations are supported, and ultimately quantum computation is implemented. Specifically, the quantum program is an instruction sequence through which quantum logic gates are operated in a specific time sequence.

In actual application, limited by the development of hardware of a quantum device, quantum computation simulation often needs to be performed to verify a quantum algorithm, quantum application, and the like. The quantum computation simulation is a process in which virtual architecture (that is, a quantum virtual machine) built by using resources of a common computer realizes simulation of running a quantum program corresponding to a specific problem. Generally, the quantum program corresponding to the specific problem needs to be constructed. The quantum program in this embodiment of the present application is a program that is written in a classical language and that indicates quantum bits and their evolution. Herein, quantum bits, quantum logic gates, and the like related to quantum computation are all represented by corresponding classical code.

The quantum circuit, as an embodiment of the quantum program, is also referred to as a quantum logic circuit and is the most commonly used general quantum computation model. The quantum circuit means a circuit that operates quantum bits from an abstract concept, and includes quantum bits, lines (timelines), and various quantum logic gates. Finally, a result usually needs to be read through a quantum measurement operation.

A conventional circuit is connected through metallic wires to transmit voltage signals or current signals. Different from the conventional circuit, the quantum circuit may be considered to be connected by time. To be specific, a state of a quantum bit evolves naturally with time. This process proceeds according to an instruction of the Hamiltonian operator until the quantum bit is operated by a logic gate.

One quantum program as a whole corresponds to one total quantum circuit. The quantum program described in the present application indicates the total quantum circuit. A total quantity of quantum bits in the total quantum circuit is the same as a total quantity of quantum bits in the quantum program. It may be understood that one quantum program may include a quantum circuit, a measurement operation for quantum bits in the quantum circuit, a register for saving a measurement result, and a control flow node (a jump instruction), and one quantum circuit may include tens of or hundreds of or even thousands of quantum logic gate operations. An execution process of the quantum program is a process of executing all quantum logic gates in a specific time sequence. It should be noted that the time sequence is a sequence of time at which an individual quantum logic gate is executed.

It should be noted that in classical computation, the most basic unit is a bit, and the most basic control mode is a logic gate. A purpose of controlling a circuit may be achieved through a combination of logic gates. Similarly, a manner of processing the quantum bit is the quantum logic gate. The use of the quantum logic gate enables the evolution of a quantum state. The quantum logic gate is a base for forming the quantum circuit. The quantum logic gate includes single-bit quantum logic gates such as the Hadamard gate (H gate), the Pauli-X gate (X gate), the Pauli-Y gate (Y gate), the Pauli-Z gate (Z gate), the RX gate, the RY gate, and the RZ gate; and multi-bit quantum logic gates such as the CNOT gate, the CR gate, the iSWAP gate, or the Toffoli gate. The quantum logic gate is generally represented by using a unitary matrix. The unitary matrix is not only a matrix form but also an operation and a transform. Generally, an action of the quantum logic gate on a quantum state is calculated by left multiplying a unitary matrix by a matrix corresponding to a quantum state ket.

Quantum amplitude estimation (QAE) is a classical quantum algorithm for estimating an amplitude of a quantum state. The QAE algorithm is based on quantum phase estimation (QPE), which requires a relatively large quantity of quantum bits and a relatively large quantity of quantum gates such as a controlled logic gate. Therefore, a large quantity of bits and logic gates are consumed.

The iterative quantum amplitude estimation (IQAE) algorithm is a quantum-classical hybrid algorithm for estimating an amplitude of a quantum state. In this algorithm, amplitude estimation is performed based on amplitude amplification and a confidence interval, while QPE is not required. Therefore, only relatively small quantities of bits, quantum logic gates, and measurement times are needed to enable a confidence interval to reach required precision.

Assuming that there is a quantum algorithm (which does not involve measurement) applied to (n+1) initial states that are all 0, the equation is as follow:

$$A|0\rangle_n|0\rangle = \sqrt{1-a}|\psi_0\rangle_n|0\rangle + \sqrt{a}|\psi_1\rangle_n|1\rangle.$$

Herein, $a \in [0,1]$ is unknown, $|\psi_0\rangle_n$ and $|\psi_1\rangle_n$ are two normalized quantum states but do not necessarily orthogonal to each other. The method for amplitude estimation is used to estimate a value of $\alpha$.

Figure 2:
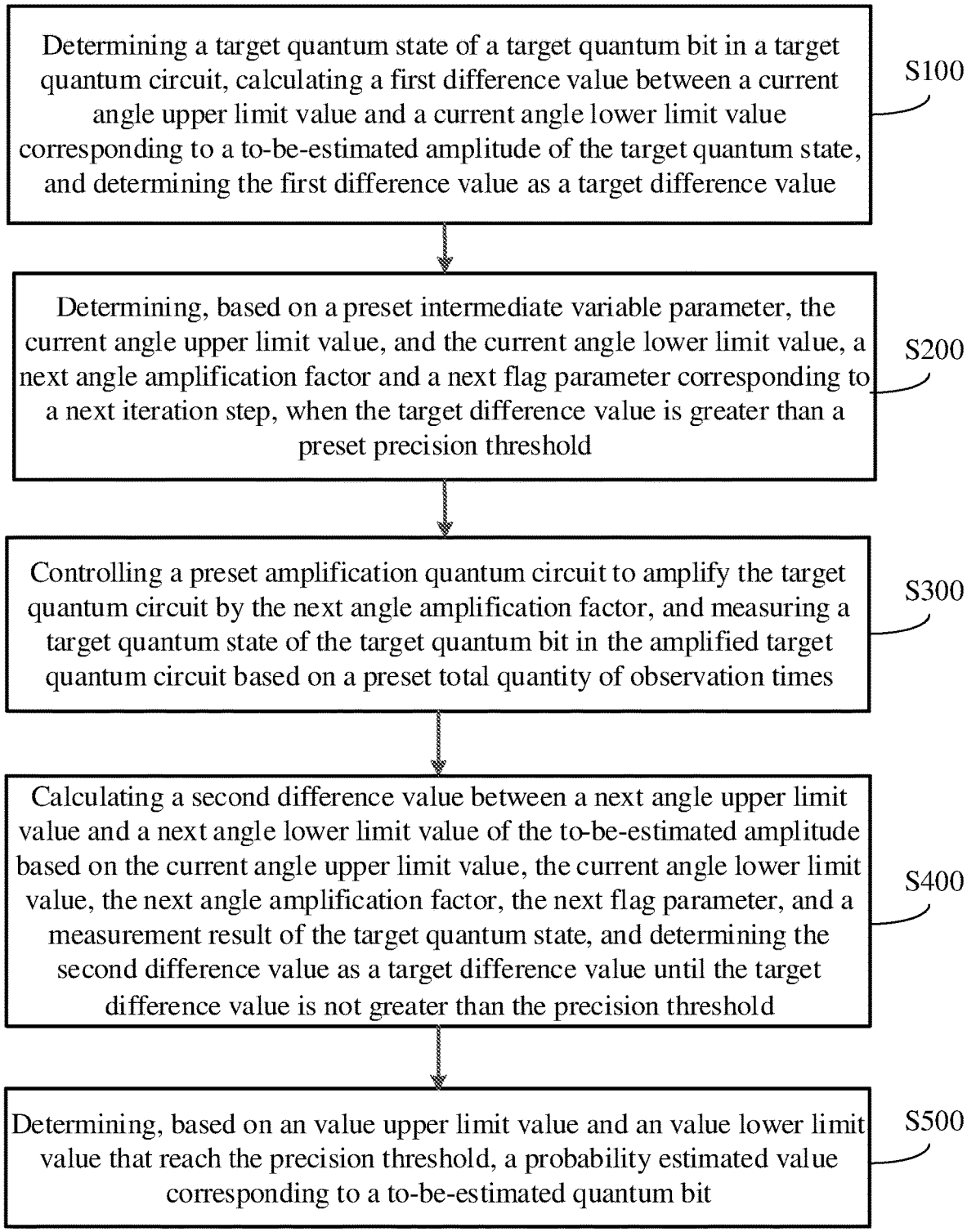
FIG. 2 is a schematic flowchart of a method for amplitude estimation of a quantum circuit according to an embodiment of the present application.

FIG. 2 is a schematic flowchart of a method for amplitude estimation of a quantum circuit according to an embodiment of the present application. The method for amplitude estimation of a quantum circuit includes the following steps.

Step S100: Determining a target quantum state of a target quantum bit in a target quantum circuit, calculating a first difference value between a current angle upper limit value and a current angle lower limit value that are corresponding to a to-be-estimated amplitude of the target quantum state, and determining the first difference value as a target difference.

The existing method for amplitude estimation of a quantum circuit (IQAE) is prone to a problem that an amplitude value cannot converge. To solve the foregoing problem, in the present application, an amplification parameter of an amplification quantum circuit in each iteration step is determined. Continuous iteration is performed to make a difference between an angle upper limit value and an angle lower limit value not greater than a precision threshold. In this way, the problem that an amplitude value cannot converge is avoided, and precision of an estimated amplitude value is improved. Instead of the QPE algorithm, the present application is based on the Grover algorithm, and triangular transformation is performed on a to-be-estimated parameter. In addition, a confidence interval is estimated based on a measurement result. A quantity of times the Grover operator functions is controlled, and continuous iteration is then performed to find a requirement for enabling a distance between an upper limit and a lower limit of the to-be-estimated parameter to meet a specified confidence level and precision.

Specifically, the angle upper limit value $\theta_u$ in the current iteration step is obtained, that is, the current angle upper limit value; and the angle lower limit value $\theta_l$ in the current iteration step is obtained, that is, the current angle lower limit value. Then, the angle difference in the current iteration step is calculated and determined as the target difference. Further, it is determined whether the angle difference in the current iteration step meets a condition, that is, whether the angle difference is not greater than the preset precision threshold. When the angle difference in the current iteration step meets the condition, that is, when the target difference is not greater than the precision threshold, it indicates that the to-be-estimated amplitude a reaches a convergence condition.

Step S200: Determining, based on a preset intermediate variable parameter, the current angle upper limit value, and the current angle lower limit value, a next angle amplification factor and a next flag parameter that are corresponding to a next iteration step, when the target difference is greater than a preset precision threshold.

In this embodiment, when the target difference is greater than the preset precision threshold, that is, when the amplitude a obtained through the current iteration step does not reach the convergence condition, a next amplitude iteration step needs to be further performed.

An initial value is set, that is, an initial iteration quantity iter=0(i=0). An initial confidence interval $[\theta_l, \theta_u]=[0,\pi]$ of $\theta_a$ is set. A precision $^\varepsilon$ is set. The precision threshold may be a preset multiple of the precision, for example, $2^\varepsilon$ or $1.5^\varepsilon$. An initial angle amplification factor $k_i$ is set to 0. Herein, an angle difference in a first iteration step (that is, $\theta_u - \theta_l = \pi$) is greater than the preset precision threshold. Optionally, a next angle amplification factor needed in a second iteration step is calculated.

An angle maximum value and an angle minimum value in the second iteration step are calculated based on an angle upper limit value and an angle lower limit value in the first iteration step and according to preset calculation formulas $\theta_i^{min}=K\theta_l$ and $\theta_i^{max}=K\theta_u$. Herein, a preset intermediate variable parameter $K=K_{max}-(K_{max}-2)\%4$, and $$K_{max} = \left\lfloor \frac{1}{2(\theta_u - \theta_l)} \right\rfloor,$$

wherein the symbol ⌊ ⌋ means round down to an integer.

A range of an angle in the second iteration step is determined as follows based on the angle maximum value and the angle minimum value, for example, when the angle is at an upper semicircle, that is, $\theta_i^{max}-\lfloor\theta_i^{max}\rfloor>0.5$ and $\theta_i^{max}-\lfloor\theta_i^{max}\rfloor>\theta_i^{min}-\lfloor\theta_i^{min}\rfloor$, and the next angle amplification factor in the second iteration step is $k_{i+1}=\text{int}(K-2)/4$, a next flag parameter in the second iteration step is $up_{i+1}=\text{true}$.

when the angle is at a lower semicircle, that is, $\theta_i^{min}-\lfloor\theta_i^{min}\rfloor>0.5$ and $\theta_i^{max}-\lfloor\theta_i^{max}\rfloor>\theta_i^{min}-\lfloor\theta_i^{min}\rfloor$, and the next angle amplification factor in the second iteration step is $k_{i+1}=\text{int}(K-2)/4$, a next flag parameter in the second iteration step is $up_{i+1}=\text{false}$.

Optionally, the step of determining, based on a preset intermediate variable parameter, the current angle upper limit value, and the current angle lower limit value, a next angle amplification factor and a next flag parameter that are corresponding to a next iteration step, when the target difference is greater than a preset precision threshold includes:

when the target difference is greater than the precision threshold, obtaining a variable parameter in the current iteration step, reducing the variable parameter in the current iteration step by a preset value, and determining the reduced variable parameter as an intermediate variable parameter corresponding to the next iteration step;

determining a next angle maximum value based on the current angle upper limit value and the intermediate variable parameter;

determining a next angle minimum value based on the current angle lower limit value and the intermediate variable parameter; and determining, based on the next angle maximum value and the next angle minimum value, the next angle amplification factor and the next flag parameter that are corresponding to the next iteration step.

In this embodiment, an idea of a function for determining the angle amplification factor in the next iteration step is to first find an upper limit value K (that is, the intermediate variable parameter) of a possible value of the next angle amplification factor. In other words, after amplification, $\theta_u-\theta_l$ is less than $\pi$. In this way, it is ensured that $\theta_u$ and $\theta_l$ are on the same half plane with high probability. Then, the upper limit value K of the value is gradually reduced until K meets a condition for the same half plane. In this case, K is a maximum value meeting the condition. Specifically, when an angle difference in the second iteration step is greater than the precision threshold, optionally, a next angle amplification factor needed in a next iteration step is calculated, that is, an angle amplification factor in a third iteration step. An intermediate variable parameter K in the second iteration step (that is, the variable parameter in the current iteration step) is reduced by a preset value. For example, the variable parameter K in the current iteration step is subtracted by a fixed value of 4, or 2, or the like. An obtained difference is used as an intermediate variable parameter in the third iteration step.

An angle maximum value and an angle minimum value in the third iteration step are calculated based on the intermediate variable parameter K in the third iteration step and the angle upper limit value and the angle lower limit value in the second iteration step according to preset calculation formulas $\theta_i^{min}=K\theta_l$ and $\theta_i^{max}=K\theta_u$.

A range of an angle in the third iteration step is determined as follows based on the angle maximum value and the angle minimum value, for example, when the angle is at an upper semicircle, that is, $\theta_i^{max}-\lfloor\theta_i^{max}\rfloor<0.5$ and $\theta_i^{max}-\lfloor\theta_i^{max}\rfloor>\theta_i^{min}-\lfloor\theta_i^{min}\rfloor$, and the next angle amplification factor in the third iteration step is $k_{i+1}=\text{int}(K-2)/4$, a next flag parameter in the third iteration step is $up_{i+1}=\text{true}$.

when the angle is at a lower semicircle, that is, $\theta_i^{max}-\lfloor\theta_i^{min}\rfloor>0.5$ and $\theta_i^{max}-\lfloor\theta_i^{max}\rfloor>\theta_i^{min}-\lfloor\theta_i^{min}\rfloor$, and the next angle amplification factor in the third iteration step is $k_{i+1}=\text{int}(K-2)/4$, a next flag parameter in the third iteration step is $up_{i+1}=\text{false}$.

Step S300: Controlling a preset amplification quantum circuit to amplify the target quantum circuit by the next angle amplification factor, and measuring a target quantum state of the target quantum bit in the amplified target quantum circuit based on a preset total quantity of observation times.

In this embodiment, a preset amplification quantum circuit Q is used to amplify a quantum circuit A by using a next angle amplification factor k as an amplification order, and a formula is as follows:

$$Q^k A|0\rangle_n|0\rangle = \cos((2k+1)\theta_a)|\psi_0\rangle_n|0\rangle + \sin((2k+1)\theta_a)$$
$$|\psi_1\rangle_n|1\rangle, \text{ where } a=\sin^2(\theta_a).$$

a is equivalent to an estimation parameter $\theta_a$, a confidence interval of $\theta_a$ is set to $[\theta_l, \theta_u]=[0, \pi]$, and $a=\sin^2(\theta_a)$ is transformed to $(1-\cos(2\theta_a))/2$ according to a triangular transformation formula $\sin^2(\theta)=(1-\cos(2\theta))/2$. An objective is to find a maximum angle amplification factor k (so that a length of the confidence interval of a is sufficiently less than the preset precision threshold), so that $(4k+2)\theta_a$ sufficiently falls within $[0, \pi]$ or $[\pi, 2\pi]$. Then, based on reversibility of a function $\cos(x)$ (namely, monotonicity of the function) in the interval $[0, \pi]$ or $[\pi, 2\pi]$, a confidence interval $[\theta_l, \theta_u]$ meeting the condition is obtained based on a relatively large confidence $1-\alpha$ by using a Chernoff-Hoeffding or Clopper-Pearson confidence interval estimation method.

In this way, $P(\theta_a \notin [\theta_l, \theta_u]) \leq \alpha$.

Herein, $\theta_u-\theta_l<2\varepsilon$ ($\varepsilon$ is a specific precision), and $[a_l, a^u]$ calculated based on $[\theta_l, \theta_u]$ and $a=\sin 2(\theta_a)$ also meets $a_u-a_l<2\varepsilon$.

In this way, $P(a \notin [a_l, a_u]) \leq \alpha$.

Herein, a precision of a is definitely less than a precision of 0. Therefore, a value of the to-be-estimated value a is determined as $(a_u+a_l)/2$ based on the preset confidence $1-\alpha$.

Figure 3:
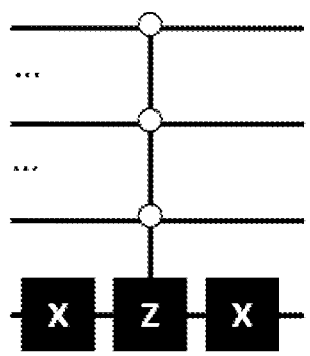
FIG. 3 is a schematic diagram of an amplification quantum circuit according to an embodiment of the present application.

A specific quantum circuit is shown in FIG. 3. A Q operator needs to be constructed based on an A operator. A mathematical expression of the Q operator is as follows:

$$Q=-AS_0 A^\dagger S_{\psi_0}$$

Herein, $S_{\psi_0}=I-2|\psi_0\rangle\langle\psi_0|\otimes|0\rangle\langle 0|$, and $S_0=I-|0\rangle_{n+1}\langle 0|_{n+1}$. After the A operator functions, an equivalent quantum circuit of $S_{\psi_0}$ may be constructed by applying an X gate and a Z gate to a final quantum bit. $S_0$ may be constructed by running a multi-controlled X gate and a Z gate (that is, constructed based on the final quantum bit).

After circuit amplification is performed on the target quantum circuit A, a quantum state of a final bit (alternatively, another specified bit) in the target quantum circuit is measured based on a preset total quantity of observation times. In addition, a quantity counts of times that the final bit of the quantum circuit $Q^{k_i}A|0\rangle_n|0\rangle$ is measured as $|1\rangle$ is recorded and determined as a measurement result, that is, a quantity of times of measuring the target quantum state of the target quantum bit.

Optionally, step S300 specifically includes:
determining, based on a preset maximum iteration quantity, a preset initial scale factor, and an iteration error corresponding to the current iteration step, a quantity of observation times of observing the target quantum state in the next iteration step as the total quantity of observation times; and counting a target quantity of times that the target quantum state is a specified state, calculating, based on the target quantity of times and the total quantity of observation times, a target frequency parameter obtained when the target quantum state is the specified state, and determining the target frequency parameter as the measurement result.

In this embodiment, a value of the total quantity of observation times may directly affect estimation efficiency of an amplitude algorithm and stability of an estimated value. When the total quantity of observation times is set based on an empirical value (for example, 100), an estimated result easily converges to a wrong value when the value is set excessively small, and estimation efficiency decreases when the value is set excessively large. To solve the foregoing problem, the quantity of observation times required in the next iteration step is determined based on the preset maximum iteration quantity, the preset initial scale factor, and the iteration error corresponding to the current iteration step. Specifically, a formula for calculating the total quantity of observation times is as follows:

$$N_{shots}=\mathrm{int}(\mathrm{round}_{max}*\mathrm{scla}*\log(2.0/\alpha*\log(\pi/4/\mathrm{esp}))).$$

Herein, an iteration error in the current iteration step is $\mathrm{esp}=(\theta_u-\theta_l)*\mathrm{PI}/2.0$, $\mathrm{PI}=\pi$, and a scale factor scla corresponding to an initial quantity of measurement times is equal to 3.0/4.0.

In a specific embodiment, to avoid an excessively large precision difference, an upper limit value esp of an iteration error is set to PI/8.0. In other words, PI/8.0 is taken when the iteration error exceeds PI/8.0, and data in an iteration step is invalid data when the iteration error exceeds a maximum error in a single iteration. In this case, a maximum error in the single iteration is $$L_{max}=\left[\left(\frac{2}{N_{max}}\log(2round_{max}/\alpha)\right)^{1/4}\right],$$

$\alpha=1-\mathrm{Confidence}$, and Confidence is a preset value. To avoid an excessively large quantity of measurement times, a threshold of the total quantity of observation times is set as follows: $N_{shots}=N_{max}$. In other words, $N_{max}$ is taken when the total quantity of observation times exceeds $N_{max}$. Herein, $$N_{max}=\frac{32}{(1-2\sin(\pi/14))^2}\log\left(\frac{2}{\alpha}\log_r\left(\frac{\pi}{4\varepsilon}\right)\right).$$

After the total quantity of observation times in the next iteration step is determined, the quantum state of the target quantum bit (the final quantum bit or the another quantum bit) is measured for the total quantity of measurement times, and a target quantity of times for which the target quantum state of the target quantum bit is |1⟩ is counted. In addition, a ratio of the target quantity of times to the total quantity of observation times is recorded as the target frequency parameter for which the target quantum state of the target quantum bit is a specified state, that is, the measurement result.

In more embodiments, to effectively use existing measurement data, improve utilization of the measurement data, and improve precision of the amplitude estimation, target quantities of times for which target quantum states of target quantum bits with a same angle amplification factor in various iteration steps (that is, the same angle amplification factor k) are |1⟩ are summed. In addition, total quantities of observation times with a same angle amplification factor in various iteration steps are summed. Then, a ratio of the sum of the target quantities of times to the sum of the total quantities of observation times after the summation is denoted as the target frequency parameter, that is, the measurement result.

Step S400: Calculating a second difference value between a next angle upper limit value and a next angle lower limit value of the to-be-estimated amplitude based on the current angle upper limit value, the current angle lower limit value, the next angle amplification factor, the next flag parameter, and a measurement result of the target quantum state, and determining the second difference value as a target difference and repeating the process until the target difference is not greater than the precision threshold.

In this embodiment, the next angle upper limit value and the next angle lower limit value of the to-be-estimated amplitude is calculated based on the current angle upper limit value, the current angle lower limit value, the next angle amplification factor, the next flag parameter, and the measurement result of the target quantum state. Then, the second difference value between the next angle upper limit value and the next angle lower limit value of the to-be-estimated amplitude is calculated and denoted as the target difference. Step S100 is returned to when the second difference value is greater than the precision threshold. Optionally, required parameters in the next iteration step are calculated for iterative computation of the angle. The iterative computation of the angle is stopped when the second difference value is not greater than the precision threshold.

The step of calculating a second difference value between a next angle upper limit value and a next angle lower limit value of the to-be-estimated amplitude based on the current angle upper limit value, the current angle lower limit value, the next angle amplification factor, the next flag parameter, and a measurement result of the target quantum state includes:

calculating, according to a triangular transformation formula and based on the next flag parameter and the frequency confidence interval, an angle confidence interval corresponding to a current angle;

determining the next angle upper limit value based on an upper limit value corresponding to the angle confidence interval, the current angle upper limit value, and the next angle amplification factor;

determining the next angle lower limit value based on a lower limit value corresponding to the angle confidence interval, the current angle lower limit value, and the next angle amplification factor; and calculating the second difference value between the next angle upper limit value and the next angle lower limit value of the to-be-estimated amplitude.

The preset confidence interval estimation function includes a Chernoff-Hoeffding function or a Clopper-Pearson function.

In this embodiment, the frequency confidence interval $[a_{lower},a_{upper}]$ corresponding to the target frequency parameter is estimated according to the Chernoff-Hoeffding or Clopper-Pearson confidence interval estimation function, and $a=\sin^2(\theta_a)$ is transformed to $(1-\cos(2\theta_a))/2$ according to the triangular transformation formula $\sin^2(\theta)=(1-\cos(2\theta))/2$. Then, a confidence interval $[\theta_{min}, \theta_{max}]$ of $\theta$ is calculated based on $[a_{lower}, a_{upper}]$, and the next flag $up_i$, and $(1-\cos(2\theta a))/2$ in the next iteration step. If the angle is at an upper semicircle, that is, $up_i$=true, $\theta_{min}=\arccos(1-2a_{lower})$, and $\theta_{max}=\arccos(1-2a_{upper})$. If the angle is at a lower semicircle, $\theta_{min}=2\pi-\arccos(1-2a_{upper})$, and $\theta_{max}=2\pi-\arccos(1-2a_{lower})$. Then, calculation formulas of the angle upper limit value and the angle lower limit value in the next iteration step are as follows:

$$(\theta_l)_{i+1} = \frac{[K_{i+1}(\theta_l)_i] + \theta_{min}/2\pi}{K_{i+1}},$$

$$\text{and } (\theta_u)_{i+1} = \frac{[K_{i+1}(\theta_u)_i] + \theta_{max}/2\pi}{K_{i+1}}.$$

Herein, $K_{i+1}=4k_i+2$. Therefore, the angle upper limit value and the angle lower limit value in the next iteration step are determined based on the angle upper limit value and the angle lower limit value in the current iteration step.

The step of determining the frequency confidence interval corresponding to the target frequency parameter includes:
  calculating, based on a preset confidence interval estimation function, the maximum iteration quantity, and the total quantity of observation times, a length of a frequency confidence interval corresponding to the target frequency parameter; and
  estimating, based on the length of the frequency confidence interval, the frequency confidence interval corresponding to the target frequency parameter.

In this embodiment, a calculation formula for calculating the length of the frequency confidence interval based on the preset confidence interval estimation function, the maximum iteration quantity, and the total quantity of observation times is as follows:

$$esp\_val = \sqrt{\frac{\log(2*\text{round}_{max}/\alpha)}{2.0*\min(\text{shots\_sum}, N_{max})}}$$

Herein, $\text{round}_{max}$ is a maximum iteration quantity in a single iteration step, shots_num is the total quantity of observation times, $\alpha$=1−Confidence, Confidence is a preset value, and min(shots_num, $N_{max}$) is a smaller value in shots_num and $N_{max}$.

Then, a calculation formula of the lower limit value of the confidence interval and a calculation formula of the upper limit value of the confidence interval are as follows:
  $a_{lower}$=val−esp_val, and
  $a_{upper}$=val+esp_val.

Herein, $a_{lower}$ is not less than 0, and $a_{upper}$ is not greater than 1.

In this embodiment, the quantity of observation times in the denominator is changed from the maximum quantity of observation times $N_{max}$ to the real-time total quantity of observation times shots_num. In this way, the following problem is avoided: A range is narrowed down and converges to a wrong value at the beginning with a small quantity of observation times, and the frequency confidence interval of the target frequency parameter val is determined on this basis.

For a problem that the amplitude estimation algorithm is prone to convergence to a wrong value, this application improves a calculation manner of the Chernoff-Hoeffding formula. The denominator in the calculation of the original formula is $N_{max}$. As a result, the following problem easily occurs: The range is narrowed down and converges to a wrong value at the beginning with a small quantity of observation times. In addition, a change to the total quantity of observation times N with the same angle amplification factor k also easily leads to a cliff-like decrease in N when k is updated and therefore non-convergence of a final result. Therefore, in this application, an input parameter is changed to twice a cumulative quantity of observation times, and stably takes $N_{max}$ until this value reaches $N_{max}$.

Step S500: Determining, based on an angle upper limit value and an angle lower limit value that reach the precision threshold, a probability estimated value corresponding to a to-be-estimated quantum bit.

Step S500 includes: calculating, based on the angle upper limit value and the angle lower limit value that reach the precision threshold, an upper limit value and a lower limit value corresponding to the frequency confidence interval, and determining, based on an average value of the upper limit value and the lower limit value corresponding to the frequency confidence interval, an estimated amplitude value corresponding to the to-be-estimated amplitude.

In this embodiment, after the upper limit value and the lower limit value corresponding to the frequency confidence interval are determined, an amplitude estimation value corresponding to the to-be-estimated amplitude is determined by applying the upper limit value and the lower limit value corresponding to the frequency confidence interval to the amplitude calculation formula $a=(a_l+a_u)/2$.

In a specific embodiment, to improve precision of the amplitude estimation value, $a_l$ and $a_u$ in the next iteration step are determined through calculation based on $\theta_l$, $\theta_u$, $a_l=\sin^2(2\pi\theta_l)$, and $a_u=\sin^2(2\pi\theta_u)$ in the next iteration step. The amplitude estimation value corresponding to the to-be-estimated amplitude is determined by applying the upper limit value and the lower limit value that are corresponding to the frequency confidence interval to the amplitude calculation formula $a=(a_l+a_u)/2$. Herein, the frequency confidence interval of the target frequency parameter val is estimated based on $a_{lower}$=val−esp_val and $a_{upper}$=val+esp_val. Then, after $\theta_l$ and $\theta_u$ are determined in the next iteration step, optionally, the frequency confidence interval of the target frequency parameter is precisely calculated as the amplitude estimation value according to $a_l=\sin^2(2\pi\theta_l)$ and $a_u=\sin^2(2\pi\theta_u)$.

In comparison with the conventional technologies, based on the method for amplitude estimation of a quantum circuit provided in the present application, in the present application, the next angle amplification factor and the next flag parameter that are corresponding to the next iteration step are determined based on the intermediate variable parameter, the current angle upper limit value, and the current angle lower limit value in the current iteration step when the difference between the current angle upper limit value and the current angle lower limit value in the current iteration step is greater than the precision threshold. In addition, the amplification quantum circuit is controlled to amplify the target quantum circuit by using the next angle amplification factor as an amplification parameter, to facilitate measurement of the target quantum state of the target quantum bit in the amplified target quantum circuit. Then, the next angle upper limit value and the next angle lower limit value in the next iteration step are calculated based on the measurement result of the target quantum state with reference to parameters such as the current angle upper limit value, the current angle lower limit value, the next angle amplification factor, and the next flag parameter. The iteration stops when the difference between the next angle upper limit value and the angle lower limit value is less than the precision threshold. In addition, the amplitude estimation for the to-be-estimated amplitude is completed based on the measurement result of the target quantum state. Therefore, an amplification parameter of an amplification quantum circuit in each iteration step is determined. Continuous iteration is performed to make a difference between an angle upper limit value and an angle lower limit value not greater than the precision threshold. In this way, the problem that an amplitude value cannot converge is avoided, and precision of an estimated amplitude value is improved.

An embodiment of the present application provides an apparatus for amplitude estimation of a quantum circuit. The apparatus for amplitude estimation of a quantum circuit includes:

a first difference value calculation module, configured to: determine a target quantum state of a target quantum bit in a target quantum circuit, calculate a first difference value between a current angle upper limit value and a current angle lower limit value that are corresponding to a to-be-estimated amplitude of the target quantum state, and determine the first difference value as a target difference;

an angle factor calculation module, configured to: determine, based on a preset intermediate variable parameter, the current angle upper limit value, and the current angle lower limit value, a next angle amplification factor and a next flag parameter that are corresponding to a next iteration step, when the target difference is greater than a preset precision threshold;

a quantum state measurement module, configured to: control a preset amplification quantum circuit to amplify the target quantum circuit by the next angle amplification factor, and measure a target quantum state of the target quantum bit in the amplified target quantum circuit based on a preset total quantity of observation times;

a second difference value calculation module, configured to: calculate a second difference value between a next angle upper limit value and a next angle lower limit value of the to-be-estimated amplitude based on the current angle upper limit value, the current angle lower limit value, the next angle amplification factor, the next flag parameter, and a measurement result of the target quantum state, determine the second difference value as a target difference and repeating the process until the target difference is not greater than the precision threshold; and a target amplitude estimation module, configured to determine, based on an angle upper limit value and an angle lower limit value that reach the precision threshold, a probability estimated value corresponding to a to-be-estimated quantum bit.

Optionally, the apparatus for amplitude estimation of a quantum circuit further includes a module for calculating a quantity of observation times and a frequency parameter calculation module.

The module for calculating a quantity of observation times is configured to determine, based on a preset maximum iteration quantity, a preset initial scale factor, and an iteration error corresponding to the current iteration step as the total quantity of observation times, a quantity of observation times of observing the target quantum state in the next iteration step.

The frequency parameter calculation module is configured to: count a target quantity of times that the target quantum state is a specified state, calculate, based on the target quantity of times and the total quantity of observation times, a target frequency parameter obtained when the target quantum state is the specified state, and determine the target frequency parameter as the measurement result.

Optionally, the frequency parameter calculation module is further configured to:

calculate, based on a preset confidence interval estimation function, the maximum iteration quantity, and the total quantity of observation times, a length of a frequency confidence interval corresponding to the target frequency parameter; and estimate, based on the length of the frequency confidence interval, the frequency confidence interval corresponding to the target frequency parameter.

Optionally, the second difference value calculation module is further configured to:

calculate, according to a triangular transformation formula and based on the next flag parameter and the frequency confidence interval, an angle confidence interval corresponding to a current angle;

determine the next angle upper limit value based on an upper limit value corresponding to the angle confidence interval, the current angle upper limit value, and the next angle amplification factor;

determine the next angle lower limit value based on a lower limit value corresponding to the angle confidence interval, the current angle lower limit value, and the next angle amplification factor; and calculate the second difference value between the next angle upper limit value and the next angle lower limit value of the to-be-estimated amplitude.

Optionally, the target amplitude estimation module is further configured to:

calculate, based on the angle upper limit value and the angle lower limit value that reach the precision threshold, an upper limit value and a lower limit value corresponding to the frequency confidence interval, and determine, based on an average value of the upper limit value and the lower limit value that are corresponding to the frequency confidence interval, an estimated amplitude value corresponding to the to-be-estimated amplitude.

The preset confidence interval estimation function includes a Chernoff-Hoeffding function or a Clopper-Pearson function.

Optionally, the angle factor calculation module is further configured to:

when the target difference is greater than the precision threshold, obtain a variable parameter in the current iteration step, reduce the variable parameter in the current iteration step by a preset value, and determine the reduced variable parameter as an intermediate variable parameter that are corresponding to the next iteration step;

determine a next angle maximum value based on the current angle upper limit value and the intermediate variable parameter;

determine a next angle minimum value based on the current angle lower limit value and the intermediate variable parameter; and determine, based on the next angle maximum value and the next angle minimum value, the next angle amplification factor and the next flag parameter that are corresponding to the next iteration step.

An embodiment of the present application provides a storage medium. The storage medium stores a computer program. When the computer program is run, the steps in any one of the foregoing implementations of the method embodiment are performed.

Specifically, in this embodiment, the storage medium may be configured to store a computer program for performing the following steps:

S100: determining a target quantum state of a target quantum bit in a target quantum circuit, calculating a first difference value between a current angle upper limit value and a current angle lower limit value that are corresponding to a to-be-estimated amplitude of the target quantum state, and determining the first difference value as a target difference;

S200: determining, based on a preset intermediate variable parameter, the current angle upper limit value, and the current angle lower limit value, a next angle amplification factor and a next flag parameter that are corresponding to a next iteration step, when the target difference is greater than a preset precision threshold;

S300: controlling a preset amplification quantum circuit to amplify the target quantum circuit by the next angle amplification factor, and measuring a target quantum state of the target quantum bit in the amplified target quantum circuit based on a preset total quantity of observation times;

S400: calculating a second difference value between a next angle upper limit value and a next angle lower limit value of the to-be-estimated amplitude based on the current angle upper limit value, the current angle lower limit value, the next angle amplification factor, the next flag parameter, and a measurement result of the target quantum state, determining the second difference value as a target difference and repeating the process until the target difference is not greater than the precision threshold; and S500: determining, based on an angle upper limit value and an angle lower limit value that reach the precision threshold, a probability estimated value corresponding to a to-be-estimated quantum bit.

Specifically, in this embodiment, the foregoing storage medium may include but be not limited to any medium that can store a computer program, for example, a USB flash drive, a read-only memory (ROM), a random access memory (RAM), a removable hard disk, a magnetic disk, or an optical disc.

An embodiment of the present application provides an electronic apparatus, including a memory and a processor. The memory stores a computer program. The processor is configured to run the computer program, so that the steps in any one of the foregoing implementations of the method embodiment are performed.

Specifically, the electronic apparatus may further include a transmit device and an input/output device. The transmit device is connected to the processor. The input/output device is connected to the processor.

Specifically, in this embodiment, the processor may be configured to perform the following steps through a computer program:

S100: determining a target quantum state of a target quantum bit in a target quantum circuit, calculating a first difference value between a current angle upper limit value and a current angle lower limit value that are corresponding to a to-be-estimated amplitude of the target quantum state, and determining the first difference value as a target difference.

S200: determining, based on a preset intermediate variable parameter, the current angle upper limit value, and the current angle lower limit value, a next angle amplification factor and a next flag parameter that are corresponding to a next iteration step, when the target difference is greater than a preset precision threshold.

S300: controlling a preset amplification quantum circuit to amplify the target quantum circuit by the next angle amplification factor, and measuring a target quantum state of the target quantum bit in the amplified target quantum circuit based on a preset total quantity of observation times.

S400: calculating a second difference value between a next angle upper limit value and a next angle lower limit value of the to-be-estimated amplitude based on the current angle upper limit value, the current angle lower limit value, the next angle amplification factor, the next flag parameter, and a measurement result of the target quantum state, determining the second difference value as a target difference and repeating the process until the target difference is not greater than the precision threshold.

S500: determining, based on an angle upper limit value and an angle lower limit value that reach the precision threshold, a probability estimated value corresponding to a to-be-estimated quantum bit.

The constructions, features and functions of the present application are described in detail in the embodiments with reference to the accompanying drawings. The foregoing is merely preferred embodiments of the present application, and the present application is not limited by the accompanying drawings. All equivalent embodiments that are modified or changed according to the concept of the present application and do not depart from the spirit of the description and the drawings should fall within the protection scope of the present application.

What is claimed is:

1. A method for amplitude estimation of a quantum circuit, wherein the method is applied to a computer, a quantum virtual machine is built in the computer by using resources of the computer, a quantum program is running in the quantum virtual machine, the quantum program comprises a quantum circuit, wherein the method for amplitude estimation of a quantum circuit comprises:

determining a target quantum state of a target quantum bit in a target quantum circuit, calculating a first difference value between a current angle upper limit value and a current angle lower limit value that are corresponding to a to-be-estimated amplitude of the target quantum state, and determining the first difference value as a target difference;

determining, based on a preset intermediate variable parameter, the current angle upper limit value, and the current angle lower limit value, a next angle amplification factor and a next flag parameter that are corresponding to a next iteration step, when the target difference is greater than a preset precision threshold;

controlling a preset amplification quantum circuit to amplify the target quantum circuit by the next angle amplification factor, and measuring a target quantum state of the target quantum bit in the amplified target quantum circuit based on a preset total quantity of observation times;

calculating a second difference value between a next angle upper limit value and a next angle lower limit value of the to-be-estimated amplitude based on the current angle upper limit value, the current angle lower limit value, the next angle amplification factor, the next flag parameter, and a measurement result of the target quantum state, determining the second difference value as a target difference and repeating the process until the target difference is not greater than the precision threshold; and determining, based on an angle upper limit value and an angle lower limit value that reach the precision threshold, a probability estimated value corresponding to a to-be-estimated quantum bit.

2. The method for amplitude estimation according to claim 1, after the step of controlling a preset amplification quantum circuit to amplify the target quantum circuit by the next angle amplification factor, and measuring a target quantum state of the target quantum bit in the amplified target quantum circuit based on a preset total quantity of observation times, further comprising:

determining, based on a preset maximum iteration quantity, a preset initial scale factor, and an iteration error corresponding to the current iteration step, a quantity of observation times of observing the target quantum state in the next iteration step as the total quantity of observation times; and counting a target quantity of times that the target quantum state is a specified state, calculating, based on the target quantity of times and the total quantity of observation times, a target frequency parameter obtained when the target quantum state is the specified state, and determining the target frequency parameter as the measurement result.

3. The method for amplitude estimation according to claim 2, after the step of counting a target quantity of times that the target quantum state is a specified state, and calculating, based on the target quantity of times and the total quantity of observation times, a target frequency parameter obtained when the target quantum state is the specified state, further comprising:

calculating, based on a preset confidence interval estimation function, the maximum iteration quantity, and the total quantity of observation times, a length of a frequency confidence interval corresponding to the target frequency parameter; and estimating, based on the length of the frequency confidence interval, the frequency confidence interval corresponding to the target frequency parameter.

4. The method for amplitude estimation according to claim 3, wherein the step of calculating a second difference value between a next angle upper limit value and a next angle lower limit value of the to-be-estimated amplitude based on the current angle upper limit value, the current angle lower limit value, the next angle amplification factor, the next flag parameter, and a measurement result of the target quantum state comprises:

calculating, according to a triangular transformation formula and based on the next flag parameter, and the frequency confidence interval, an angle confidence interval corresponding to a current angle;

determining the next angle upper limit value based on an upper limit value corresponding to the angle confidence interval, the current angle upper limit value, and the next angle amplification factor;

determining the next angle lower limit value based on a lower limit value corresponding to the angle confidence interval, the current angle lower limit value, and the next angle amplification factor; and calculating the second difference value between the next angle upper limit value and the next angle lower limit value of the to-be-estimated amplitude.

5. The method for amplitude estimation according to claim 4, wherein the step of determining, based on an angle upper limit value and an angle lower limit value that reach the precision threshold, a probability estimated value corresponding to a to-be-estimated quantum bit comprises:

calculating, based on the angle upper limit value and the angle lower limit value that reach the precision threshold, an upper limit value and a lower limit value that are corresponding to the frequency confidence interval, and determining, based on an average value of the upper limit value and the lower limit value that are corresponding to the frequency confidence interval, an estimated amplitude value corresponding to the to-be-estimated amplitude.

6. The method for amplitude estimation according to claim 3, wherein the preset confidence interval estimation function comprises a Chernoff-Hoeffding function or a Clopper-Pearson function.

7. The method for amplitude estimation according to claim 1, wherein the step of determining, based on a preset intermediate variable parameter, the current angle upper limit value, and the current angle lower limit value, a next angle amplification factor and a next flag parameter that are corresponding to a next iteration step, when the target difference is greater than a preset precision threshold comprises:

when the target difference is greater than the precision threshold, obtaining a variable parameter in the current iteration step, reducing the variable parameter in the current iteration step by a preset value, and determining the reduced variable parameter as an intermediate variable parameter corresponding to the next iteration step;

determining a next angle maximum value based on the current angle upper limit value and the intermediate variable parameter;

determining a next angle minimum value based on the current angle lower limit value and the intermediate variable parameter; and determining, based on the next angle maximum value and the next angle minimum value, the next angle amplification factor and the next flag parameter that are corresponding to the next iteration step.

8. An apparatus for amplitude estimation of a quantum circuit, wherein the apparatus is a computer, a quantum virtual machine is built in the computer by using resources of the computer, a quantum program is running in the quantum virtual machine, the quantum program comprises a quantum circuit, wherein the apparatus for amplitude estimation of a quantum circuit comprises:

a first difference value calculation module, configured to: determine a target quantum state of a target quantum bit in a target quantum circuit, calculate a first difference value between a current angle upper limit value and a current angle lower limit value that are corresponding to a to-be-estimated amplitude of the target quantum state, and determine the first difference value as a target difference;

an angle factor calculation module, configured to: determine, based on a preset intermediate variable parameter, the current angle upper limit value, and the current angle lower limit value, a next angle amplification factor and a next flag parameter that are corresponding to a next iteration step, when the target difference is greater than a preset precision threshold;

a quantum state measurement module, configured to: control a preset amplification quantum circuit to amplify the target quantum circuit by the next angle amplification factor, and measure a target quantum state of the target quantum bit in the amplified target quantum circuit based on a preset total quantity of observation times;

a second difference value calculation module, configured to: calculate a second difference value between a next angle upper limit value and a next angle lower limit value of the to-be-estimated amplitude based on the current angle upper limit value, the current angle lower limit value, the next angle amplification factor, the next flag parameter, and a measurement result of the target quantum state, determine the second difference value as a target difference and repeating the process until the target difference is not greater than the precision threshold; and a target amplitude estimation module, configured to determine, based on an angle upper limit value and an angle lower limit value that reach the precision threshold, a probability estimated value corresponding to a to-be-estimated quantum bit.

9. A non-transitory storage medium, wherein the non-transitory storage medium stores a computer program, and when the computer program is run, the method according to claim 1 is performed.

10. An electronic apparatus, comprising a memory and a processor, wherein the memory stores a computer program, and the processor is configured to run the computer program, so that the method according to claim 1 is performed.

* * * * *